United States Patent [19]

Snitzer et al.

[11] Patent Number: 4,848,998
[45] Date of Patent: Jul. 18, 1989

[54] SELECTIVE VOLITIZATION METHOD FOR PREPARING FIBER OPTICS

[75] Inventors: Elias Snitzer, Wellesley; Richard P. Tumminelli, Ashland, both of Mass.

[73] Assignee: Polaroid Corporation, Cambridge, Mass.

[21] Appl. No.: 146,378

[22] Filed: Jan. 21, 1988

[51] Int. Cl.⁴ .............................................. C03B 37/023
[52] U.S. Cl. ........................................ 65/3.11; 65/2; 427/163
[58] Field of Search ................... 65/3.11, 2, 3.12; 427/163

[56] References Cited

U.S. PATENT DOCUMENTS

| | | | |
|---|---|---|---|
| 4,163,654 | 8/1979 | Krohn et al. | 65/3.11 |
| 4,203,743 | 5/1980 | Suganuma et al. | 65/3.12 |
| 4,277,270 | 7/1981 | Krohn | 65/3.11 |
| 4,372,767 | 2/1983 | Maklad | 65/3.12 |

FOREIGN PATENT DOCUMENTS

| | | | |
|---|---|---|---|
| 60-145922 | 8/1985 | Japan | 65/3.12 |
| 1340849 | 12/1973 | United Kingdom | 65/3.12 |
| 2176472 | 12/1986 | United Kingdom | 65/3.11 |

*Primary Examiner*—Robert L. Lindsay
*Attorney, Agent, or Firm*—Francis J. Caufield

[57] ABSTRACT

A method for fabricating optical fibers having a rare-earth doped core and a fused silica cladding includes inserting a rare-earth doped soft glass rod into a fused silica tube, the ratio of the outer diameter (OD) to the inner diameter (ID) of the fused silica tube being at least 2 and as large as 50; heating the rod and tube combination in a furnace to selectively volatilize volatile constituents of the soft glass rod which are responsible for the low softening point so that the final composition of the core consists predominantly of $SiO_2$ and the desired dopants such as rare earths, alkaline earths or other low vapor pressure materials; and drawing the perform into an optical fiber.

12 Claims, 1 Drawing Sheet

SELECTIVE VOLITIZATION METHOD FOR PREPARING FIBER OPTICS

BACKGROUND OF THE INVENTION

1. Technical Field of the Invention

The present invention relates to a method for fabricating optical fibers and, in particular, to a method for fabricating optical fibers calling for insertion of core materials into a refractory cladding tube such as $SiO_2$.

2. Description of the Prior Art

It has long been of interest in the art to fabricate optical fibers having cores which contain various rare earth ions because certain rare earth ions are known to lase in glass or to give other desirable properties such as faraday rotation. For example, ions such as $Nd^{3+}$, $Yb^{3+}$, $Er^{3+}$, $Pr^{3+}$, $Tm^{3+}$ and $Ho^{3+}$ have been made to lase in glass. Of these, trivalent neodymium has perhaps been the most important because it has been made to lase at room temperature with high efficiency. Further, with the advent of low-loss fibers made predominantly from fused silica, it became desirable to develop fiber lasers in which the composition of the rare earth doped core was compatible with a fused silica cladding. This would ensure that the laser fibers would be compatible in numerical aperture (NA) and in other respects with "communications grade" low-loss fused silica single mode or multimode fibers.

A number of prior art methods have been tried to produce such low-loss, rare earth doped, fused silica fibers having cores with high rare earth content. For example, one method used for fabricating low-loss, rare earth doped, fused silica fibers is similar in some respects to the methods used today for making low-loss "communications grade", fused silica optical fibers. In this particular method, a modification of the Modified Chemical Vapor Deposition (MCVD) method, which is commonly referred to as inside chemical vapor deposition, rare earth ions are introduced into the core of the fiber by admitting volatile compounds of the desired rare earth ions into the reaction zone within a preform. A chemical reaction occurs in the reaction zone, and another compound, which contains the rare earth ion, is deposited on the inside the preform as a continuous layer of glass or as a soot. The deposited material is then ion solidated into a continuous layer of glass, if necessary, and is then incorporated into the core of the optical fiber when the preform is subsequently collapsed and drawn down in to the optical fiber. This method suffers in one respect due to the difficulty in finding volatile and thermally stable materials formed with rare earth ions or other ions which it may be desirable to add to the glass to adjust its properties. The volatility is important in providing the compound in the vapor phase at reasonably low temperatures, and the thermal stability is important in transporting the compound to the reaction zone in the apparatus. Further, mass flow controllers and appropriate carrier gases are needed to deliver the compounds on a controlled basis through transport lines to ensure that the compounds remain in the gaseous state until they reach the reaction zone.

In another prior art method, referred to as a "rod-in-tube" method, various compatible combination of core and cladding glasses are used which are characterized by the fact that they do not change on drawing the fiber, and, further, the final fiber is strong, light guiding and with all the other desirable properties generally ascribed to good fibers. These can be so called hard glasses, i.e., mostly $SiO_2$, or soft glasses, i.e., alkali, alkaline earth silicates. In fact, the first rare earth doped laser fibers made consisted of soft glasses for both core and cladding. These soft glasses as, for example, window glass are typically alkali and alkali earth silicates that are commonly and commercially available in a wide range of compositions. In this prior art method, a rod of soft glass containing a rare earth compound is placed inside a tube of an appropriate soft glass. The combination is then drawn down into a fiber whose core contains the rare earth ion.

When the above-described method is applied to placing a soft glass rod into a tube of fused silica and attempts made to draw down the combination into a fiber, this method fails either because stresses are formed or because bubbles are formed by the volatile constituents in the core which "blow out" the side of the tube. This is because the coefficient of expansion for a typical soft glass is of the order of $90 \times 10^{-7}/°$ C. whereas the expansion coefficient of fused silica is roughly $3-5 \times 10^{-7}/°$ C. This radical difference in coefficient of expansion causes optical fibers fabricated with a soft glass core and a fused silica cladding to fracture on cooling, the fracture extending outward from the core-cladding interface. Further, polishing the ends of the fiber does not remove the fractures as they will be generated to extend from the polished end.

As a result of the above, there is a need in the art for a method for fabricating optical fibers and, in particular, for fabricating optical fibers having rare earth doped, fused silica cores surrounded by a fused silica cladding which is simpler and less expensive than the MCVD method and which provides a simple method like that used to fabricate optical fibers having a soft glass core embedded in a soft glass cladding.

SUMMARY OF THE INVENTION

Embodiments of the present invention advantageously solve the above-described problem in the prior art. The method comprises: fabricating a glass having a low softening point and incorporating therein other materials such as rare earth compounds and other compounds to impart desirable properties to the core glass having a relatively low vapor pressure; inserting the glass into a relatively thick tube of fused silica sealed at the bottom to form a rod-and-tube combination; heating the combination at a sufficiently high temperature and for a suitable length of time to drive certain volatile constituents out of the glass, the high vapor pressure constituents being responsible for the low softening point and high expansion coefficient of the glass; and drawing the resulting preform into an optical fiber.

In one embodiment, the soft glass is fabricated in the form of a rod and doped with rare earth ions such as neodymium or ytterbium and erbium in a manner which is well-known in the art. Further, the ratio of the outside diameter (OD) to inside diameter (ID) of the fused silica tube into which the soft glass rod is inserted should be in the range of 2 to 50 in order that the tube remain intact by the stiffness and thickness of the $SiO_2$ wall when the volatile constituents of the soft glass insert are driven therefrom. We have found that a ratio of OD to ID of 24 is preferred.

Typical temperatures for utilizing this process may be as high as 1900° C. and such temperatures may be applied for as long as 10 to 20 minutes. For this reason, we have determined that further advantageous embodiments of the present invention utilize powdered glass or a porous scintered rod instead of a rod. Such further embodiments facilitate the escape of the volatile constituent when the preform is heated.

As one can readily appreciate from the above, the inventive method is useful for fabricating optical fibers having relatively large concentrations of low vapor pressure materials in a core such as alkaline earths, for example, Ba and Ca, as well as such materials as zirconium, niobium and rare earths.

For example, we have fabricated an optical fiber having a high rare earth doped core by first fabricating a soft glass rod comprising 15 wt % $Yb_2O_3$, 0.3 wt % $Er_2O_3$, 59.8 wt % $SiO_2$, 0.9 wt % $Li_2O$, 6.4 wt % $Na_2O$, 9.7 wt % $K_2O$, 4.3 wt % $BaO$, 1.4 wt % $ZnO$, 1.3 wt % $Al_2O_3$, and 0.9 wt % $Sb_2O_3$. This rod may be used as is or it may be pulverized and used in a powder form to fabricate an optical fiber in accordance with the present invention.

BRIEF DESCRIPTION OF THE DRAWING

A complete understanding of the present invention may be gained by considering the following detailed description in conjunction with the accompanying drawing in which.

DETAILED DESCRIPTION

Figure 1:
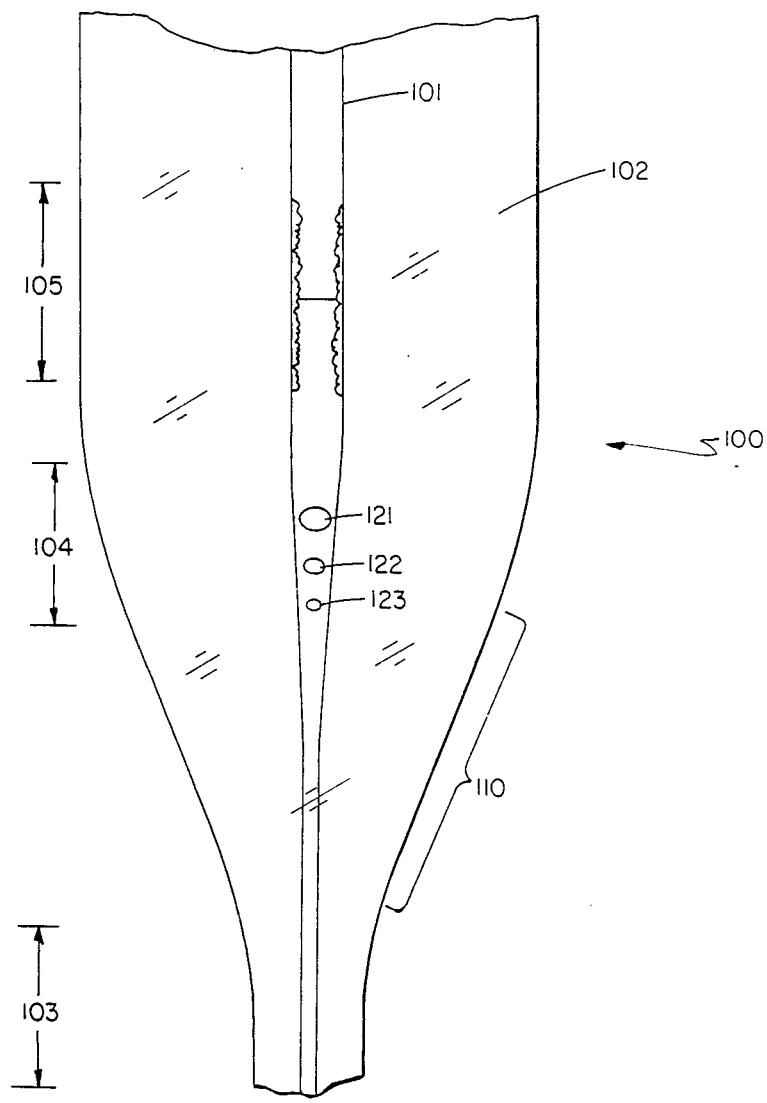
FIG. 1 shows, in pictorial form, a preform formed in accordance with one aspect of the present invention where a portion of the preform has been heated to drive off certain volatile constituents of tee soft glass rod insert.

FIG. 1 shows, in pictorial form, a rod and tube combination 100 formed in accordance with the inventive method. Combination 100 comprises core 101, formed from a rare earth doped, soft glass. Core 101 is disposed within cladding 102 formed from a fused silica tube. Tapered region 110 indicates the beginning of the drawing process for the preform and the place at which heat is applied, the furnace not being shown for clarity.

In one embodiment of the present invention, soft glass core 101 comprises 15 wt % $Yb_2O_3$, 0.3 wt % $Er_2O_3$, 59.8 wt % $SiO_2$, 0.9 wt % $Li_2O$, 6.4 wt % $Na_2O$, 9.7 wt % of $K_2O$, 4.3 wt % $BaO$, 1.4 wt % $ZnO$, 1.3 wt % $Al_2O_3$, and 0.9 wt % $Sb_2O_3$. This soft glass is fabricated as a rod in accordance with methods well-known in the art. Further, as is known in the art, the alkali and alkali earth constituents are responsible for the relatively high coefficient of expansion and low melting or softening point of the glass that cause this type of glass to be referred to as soft glass.

It is well-known in the art how to fabricate fused silica tubes such as tube 102. Further, in accordance with the inventive method, fused silica tube 102 has a relatively thick wall. The ratio of the outer diameter (OD) to the inner diameter (ID) of tube 102 is at least equal to 2 and preferably is as large as 24.

In accordance with the present invention, soft glass rod 101 is inserted into fused silica tube 102 and combination 100 formed thereby is heated in a furnace. Combination 100 is heated at a sufficiently high temperature, up to as high as 1900° C. and for suitable lengths of time, up to as long as 10 to 20 minutes, so that the volatile constituents within rod 101 which are responsible for the high coefficient of expansion and low softening point are eliminated from the core.

Referring to FIG. 1, three distinct regions are shown, regions 103, 104 and 105, respectively. Region 103 consists of the completed, stable preform which consists of a fused silica cladding and a core comprised of predominantly $SiO_2$, low concentrations of rare earth oxides, other non-volatile constituents such as BaO or various other alkaline earth oxides, and any other low vapor pressure constituents of the original soft glass rod. Region 104 shows bubbles 121-123 which contain the volatile constituents of the core which are rising through the molten glass in the heated zone where the taper from the original combination to final reduced size preform is occurring. Final region 105 consists of condensed constituents which were driven off from the core glass and which condensed from the vapor back into a solid when they entered the cold region above region 104. These condensed constituents are deposited on the inner surface of fused silica tube 102.

The above-described soft glass rod had an index of refraction before use in this method of 1.52. Fused silica has an index of refraction of 1.46. Thus, the combination, without using the method of the present invention, would have a numerical aperture (NA) of 0.43. However, using the present invention we formed an optical fiber having an NA=0.23. A further advantageous characteristic of fibers formed in accordance with the present method is that a very good non-scattering interface is formed between the core and cladding.

We have formed other fibers in accordance with the present invention by using commercially available neodymium-doped, soft glass from the Schott Glass Company, the glass being designated by the code no. LG 660. We were able to draw down to a small size a preform having a 1 mm OD and 40 microns core diameter to form a compatible combination of neodymium-doped core and fused silica cladding by the selective volatization of the present invention.

In further embodiments of the present invention, due to the high temperatures used, one need not only use soft glass rods to form preforms. In fact, such soft glass rods may be pulverized to form powder or porous sintered rods may be used. The efficiency of the powder or the porous rods is that they facilitate the escape of the volatile constituents. Thus, in accordance with the present invention, the preform is positioned in the furnace so as to permit the volatile constituents of the core, such as any alkali and the oxides of some divalent ions such as PbO, to be selectively volatized so that the final composition of the core consists predominantly of $SiO_2$. The rare earth and small concentrations of stable oxides which facilitate the solubility of the rare earth in the glass remain in the core. Further, as discussed above, the wall of the fused silica tube should be sufficiently thick so as to remain intact be its surface tension and stiffness during the volatization of the volatile constituents.

As described above, fibers fabricated in accordance with the inventive method may have contamination in the core from, for example, low vapor pressure transition metals. Nevertheless, when these fibers are used as laser fibers the effect of contaminants is not large. For example, in laser fibers there are two major causes of loss, i.e., scattering and absorption. We have found that the loss due to absorption by contaminants is offset by decreased loss due to scattering. This is because, as was described above, the volatization causes smooth contours between core and cladding and hence reduced scattering.

Although particular embodiments of the present invention have been shown and described herein, many varied embodiments incorporating the teachings of the present invention may be made without departing from its teachings. Therefore, it is intended that all matter contained in the above description or shown in the accompanying drawing shall be interpreted as illustrative and not limiting.

What is claimed is:

1. A method for fabricating optical fiber whose core and surrounding cladding have compatible physical characteristics, said method comprising the steps of:

providing a hard glass refractory tube with a predetermined softening point to become the fiber cladding;

placing a soft glass inside of said refractory tube, said soft glass being composed of constituents of differing volatility with some responsible for providing it with a lower softening point than that of said refractory tube with others present to provide compatible physical characteristics of said refractory tube and the necessary index of refraction of the fiber core;

heating the combination of said refractory tube and said soft glass to a temperature that is sufficient to volatilize at least a portion of the constituents of said soft glass responsible for its low softening point so that they escape therefrom as a gas yet not so high as to soften said refractory tube or volatilize the constituents of said soft glass intended to provide compatible physical characteristics with those of said refractory tube; and drawing said combination of said refractory tube and said soft glass down so that said refractory tube becomes the fiber cladding and the unvolatilized constituents of said soft glass become the fiber core.

2. The method of claim 1 wherein said refractory tube comprises fused silica.

3. The method of claim 2 wherein said refractory tube consists essentially of pure fused silica.

4. The method of claim 1 wherein said soft glass comprises a rare earth doped glass.

5. The method of claim 1 wherein said soft glass is a rod.

6. The method of claim 1 wherein said soft glass is a powder.

7. The method of claim 1 wherein said soft glass is a porous sintered rod.

8. The method of claim 1 wherein the low vapor pressure constituents are rare earth compounds.

9. The method of claim 1 wherein the low vapor pressure constituents are alkaline earth compounds.

10. The method of claim 1 wherein the low vapor pressure constituents are zirconium or niobium.

11. The method of claim 1 wherein said refractory tube is circular in cross-section with the ratio of its outer diameter to its inner diameter in the range between 2 and 50.

12. The method of claim 1 wherein the volatile constituents are alkali compounds.

* * * * *